A. LANZDORF.
RESILIENT DEVICE FOR VEHICLE WHEELS.
APPLICATION FILED DEC. 13, 1913.
1,151,109.   Patented Aug. 24, 1915.
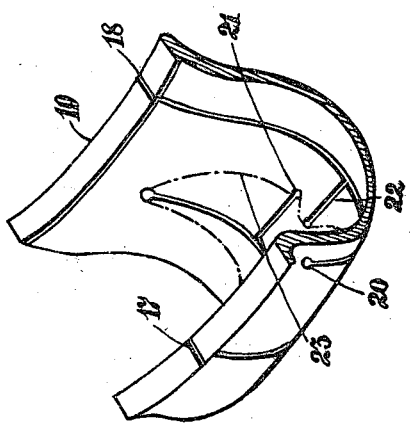

UNITED STATES PATENT OFFICE.

ADOLF LANZDORF, OF VIENNA, AUSTRIA-HUNGARY.

RESILIENT DEVICE FOR VEHICLE-WHEELS.

1,151,109.  Specification of Letters Patent.  Patented Aug. 24, 1915.

Application filed December 13, 1913. Serial No. 806,468.

*To all whom it may concern:*

Be it known that I, ADOLF LANZDORF, a subject of the Emperor of Austria-Hungary, residing at 18 Kendlergasse, Vienna, Austria-Hungary, have invented certain new and useful Improvements in Resilient Devices for Vehicle-Wheels; and I do hereby declare the following to be a full, clear, and exact description of the invention, such as will enable others skilled in the art to which it appertains to make and use the same.

The invention relates to tires and the object in view is to provide a resilient tire which will take the place of the ordinary pneumatic tire, thereby preventing the liability of puncturing incident to the use of pneumatic tires.

Other objects will be more apparent by reference to the following specification and to the claim appended thereto, and by reference to the accompanying drawing.

The drawing depicts a perspective view of part of the tire constructed in accordance with the invention.

The device made according to the invention as illustrated by way of example in the drawing consists of a cast or stamped ring-like metal covering which is open toward the felly and provided with two flanges 19. From each of these flanges extend cuts 17, 18, etc., terminating in corresponding holes 20. The nature of the special elasticity obtained in this way is represented by the elasticity line 23 shown dotted which forms triangular sections meeting one another on a spherical surface on either end and which, owing to the curvature of the cover where it lapses over, is curved in this direction also. The elasticity thus given to the running surface of the tread is assisted by elasticity lines produced between the individual sections of the flange and not only works in adjunction with the elasticity line already mentioned but also taking up the forces due to pressure and shock carries them over alternately to the individual sections of the flanges. Through the combined working of these elasticity lines located at different planes and the consequent forward movement of the transferred forces in the cover an elasticity similar to that of rubber is produced which in the case of the present device can be regulated by choosing a material for the walls of considerable strength by varying the number and length of the cuts and, finally, by the choice of the kind of resilient means to be placed in the inside of the cover. The elasticity of the cover is increased by providing between the sections of the cover branch cuts 21 and 22 transverse with respect to the first mentioned cuts so that the elasticity line 23 undergoes a slight alteration. It is a matter of indifference with regard to the form of elasticity lines produced and with regard to the general resulting elasticity of the cover whether the cuts are straight or curved vertical or diagonal to the plane of the cover.

The practical advantage of a cover according to the invention consists in the fact that the requirements of pressure and shocks coming from every direction from the running surface of the cover are met and the division or branching of the forces first takes place at the flanges to be then divided into a large number of component forces finally carried over to the support for the flanges.

The production of devices according to the invention is simple and comparatively cheap.

I claim:

In a vehicle wheel, a tire comprising a metallic, ringlike covering provided with side flanges and slits originating at points alternately disposed adjacent to one and the other of said flanges, and extending through the opposite flange, said covering being also provided with additional slits extending from the first mentioned slits, substantially, as described.

In testimony whereof, I affix my signature, in presence of two witnesses.

ADOLF LANZDORF.

Witnesses:
 KARL HEISLER,
 ADA MARIA BERGER.

Copies of this patent may be obtained for five cents each, by addressing the "Commissioner of Patents, Washington, D. C."